United States Patent
Turng et al.

(10) Patent No.: US 10,622,918 B2
(45) Date of Patent: Apr. 14, 2020

(54) CELLULOSE COMPOSITE-STRUCTURED TRIBOELECTRIC GENERATOR AND METHOD

(71) Applicant: Wisconsin Alumni Research Foundation, Madison, WI (US)

(72) Inventors: Lih-Sheng Turng, Madison, WI (US); Jun Peng, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 464 days.

(21) Appl. No.: 15/204,011

(22) Filed: Jul. 7, 2016

(65) Prior Publication Data

US 2018/0013358 A1    Jan. 11, 2018

(51) Int. Cl.
*H02N 1/04*    (2006.01)

(52) U.S. Cl.
CPC .................................... *H02N 1/04* (2013.01)

(58) Field of Classification Search
CPC ... H02N 1/04; H02N 1/00; H02N 1/002; H02N 1/008; H02N 2/00; H02N 2/0065; H02N 2/007; H02N 2/18
USPC ........................................ 310/310, 300, 309
See application file for complete search history.

(56) References Cited

U.S. PATENT DOCUMENTS

| | | | |
|---|---|---|---|
| 4,990,813 A | 2/1991 | Paramo | |
| 6,335,856 B1 | 1/2002 | Boisrayon et al. | |
| 7,004,995 B2 | 2/2006 | Schroder et al. | |
| 8,317,908 B2 | 11/2012 | Fraden | |
| 8,519,596 B1* | 8/2013 | Kim | H02N 1/04 310/309 |
| 8,536,760 B1* | 9/2013 | Kim | H02N 11/002 310/309 |
| 9,178,446 B2* | 11/2015 | Wang | H02N 1/04 |
| 2013/0049531 A1* | 2/2013 | Wang | H02N 1/04 310/309 |
| 2013/0122071 A1* | 5/2013 | Cathala | B01F 17/0028 424/401 |
| 2014/0084748 A1* | 3/2014 | Wang | H02N 1/04 310/300 |
| 2014/0246950 A1* | 9/2014 | Wang | H02N 1/04 310/310 |

(Continued)

FOREIGN PATENT DOCUMENTS

KR        20130024224        *  3/2013

OTHER PUBLICATIONS

Li et al. (From cotton to wearable pressure sensor), J. Mater. Chem. A, 2015, 3, 2181 (Year: 2014).*

(Continued)

*Primary Examiner* — Jermele M Hollington
*Assistant Examiner* — Ahmed Elnakib
(74) *Attorney, Agent, or Firm* — Boyle Fredrickson, S.C.

(57) ABSTRACT

A triboelectric generator and method are provided. The triboelectric generator includes a first electrode having an inner surface and an outer surface and a second electrode having an inner surface and an outer surface. A dielectric layer has a first surface and a second surface in engagement with the inner surface of the second electrode. The dielectric layer impregnated with biorenewable fillers. Periodic engagement of the first surface of the dielectric layer with the inner surface of the first electrode generates an electrical output across the first and second electrodes.

17 Claims, 4 Drawing Sheets

(56) References Cited

U.S. PATENT DOCUMENTS

| | | | |
|---|---|---|---|
| 2014/0300248 A1* | 10/2014 | Wang | G01L 9/0072 310/300 |
| 2014/0312141 A1* | 10/2014 | Ravishankar | B05B 12/12 239/63 |
| 2015/0001993 A1* | 1/2015 | Park | H01L 41/113 310/319 |
| 2015/0035408 A1* | 2/2015 | Despesse | H02N 1/08 310/310 |
| 2015/0061460 A1* | 3/2015 | Bae | H02N 1/04 310/310 |
| 2015/0194911 A1* | 7/2015 | Kim | H02N 1/04 310/310 |

OTHER PUBLICATIONS

Spoljaric et al. (Nanofibrillated Cellulose, Poly(vinyl alcohol), Montmorillonite Clay Hybrid Nanocomposites With Superior Barrier and Thermomechanical Properties), VTT Technical Research Centre of Finland, FI-02044 VTT, Finland (Year: 2014).*

* cited by examiner

CELLULOSE COMPOSITE-STRUCTURED TRIBOELECTRIC GENERATOR AND METHOD

REFERENCE TO GOVERNMENT GRANT

This invention was made with government support under JV-11111124-028 awarded by the USDA/FS. The government has certain rights in the invention.

FIELD OF THE INVENTION

This invention relates to generally to nanogenerators, and in particular, to a biorenewable cellulose composite structure-based triboelectric nanogenerator (CTG) with stable power output performance and a method.

BACKGROUND AND SUMMARY OF THE INVENTION

Nanogenerators are emerging devices that convert mechanical energy to electricity using piezoelectric nanomaterials. Recently, a new type of electricity-generating device called a triboelectric nanogenerator (TG) has been developed based on triboelectric and electrostatic effects. During the generating process, charge transfer occurs between two periodically contacting surfaces with various polarities of triboelectricity. Because of the superior mechanical and electromechanical properties of nanoscale structures, TGs are able to harvest energy from rotating friction, fluid or air flow, human activities, and even wearable clothing. To date, the output power of TGs has reached the milliwatt/cm$^{-2}$ level, which is sufficient to power many small electronic devices such as light-emitting diodes (LEDs), temperature sensors, portable electronic devices, displacement sensors, and several chemical and solvent vapor detectors.

To enhance the triboelectric performance, work has been done in increasing the effective friction by creating nanopatterns or nanofeatures on the film surface or by making multiple scale porous voids inside of polydimethyl-siloxane (PDMS). Furthermore, another promising strategy to enhance the triboelectric performance is to employ various kinds of conductive nanoparticles or nanowires dispersed in dielectric PDMS. However, most TGs require sophisticated surface patterns and nanostructure designs to attain high performance. Also, due to the soft and ductile behavior of nanoparticles/nanowires, the performance of TGs decreases with use or when encountering a large applied pressure. Therefore, output power stability remains an elusive goal. Moreover, the fabrication of many TGs using fillers as dielectrics involves the consumption of precious materials, for example, gold (Au) nanoparticles and carbon nanotubes. To minimize the usage of these expensive materials, utilization of other types of alternative fillers for triboelectric nanogenerators is highly desirable.

Therefore, it is a primary object and feature of the present invention to provide a biorenewable cellulose composite structure-based triboelectric nanogenerator with stable power output performance and a method of using the same.

It is a further object and feature of the present invention to provide a biorenewable cellulose composite structure-based triboelectric nanogenerator with stable power output performance which is simple to operative and inexpensive to manufacture.

It is a still further object and feature of the present invention to provide a biorenewable cellulose composite structure-based triboelectric nanogenerator with stable power output performance that generates greater electrical power than current triboelectric nanogenerators.

In accordance with the present invention, a triboelectric generator is provided. The triboelectric generator includes a first electrode having an inner surface and an outer surface and a second electrode having an inner surface and an outer surface. A dielectric layer has a first surface and a second surface in engagement with the inner surface of the second electrode. The dielectric layer is impregnated with biorenewable fillers. Periodic engagement of the first surface of the dielectric layer with the inner surface of the first electrode generates an electrical output across the first and second electrodes.

The inner surface of the first electrode is directed towards the inner surface of the second electrode and the dielectric layer is fabricated from polydimethylsiloxane (PDMS). The biorenewable fillers are fabricated from cellulose nanocrystals. The cellulose nanocrystals are flakes which are uniformly distributed throughout the dielectric layer. The flakes are orientated generally parallel to the first surface of the dielectric layer.

It is contemplated for at least one of the first and second electrodes is moveable between a first position wherein the first surface of the dielectric layer is spaced from the inner surface of the first electrode and a second position wherein the first surface of the dielectric layer is in contact with the inner surface of the first electrode.

In accordance with a further aspect of the present invention, a triboelectric generator is provided. The triboelectric generator includes a first electrode having a generally flat surface and a second electrode having a generally flat surface. A dielectric layer positioned adjacent to the surface of the first electrode. The dielectric layer is impregnated with biorenewable fillers and includes an outer surface. The periodic compression of the dielectric layer between the first and second electrodes generates an electrical output across the first and second electrodes.

The surface of the first electrode, is directed towards the surface of the second electrode and the dielectric layer is fabricated from polydimethylsiloxane (PDMS). The biorenewable fillers are fabricated from cellulose nanocrystals. The cellulose nanocrystals are flakes. The flakes are uniformly distributed throughout the dielectric layer and orientated generally parallel to the outer surface of the dielectric layer. At least one of the first and second electrodes is moveable between a first position wherein the outer surface of the dielectric layer is spaced from the second electrode and a second position wherein the outer surface of the dielectric layer is compressed by the second electrode.

In accordance with a still further aspect of the present invention, a method of generating electrical power is provided. The method includes the steps of positioning first and second electrodes in spaced relationship to each other and compressing a dielectric layer impregnated with biorenewable fillers between the first and second electrodes to generate an electrical output across the first and second electrodes.

The dielectric layer is fabricated from polydimethylsiloxane (PDMS) and the biorenewable fillers are fabricated from cellulose nanocrystals. The cellulose nanocrystals are flakes and wherein the method contemplates the additional step of uniformly distributing the flakes throughout the dielectric layer. The flakes are orientated generally parallel to the outer surface of the dielectric layer. The step of compressing the dielectric layer may include the additional step of periodically moving at least one of the first and second electrodes between a first position wherein the dielectric layer is spaced from at least of one of the first and second electrodes and a second position wherein the dielectric layer is compressed between the first and second electrodes.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
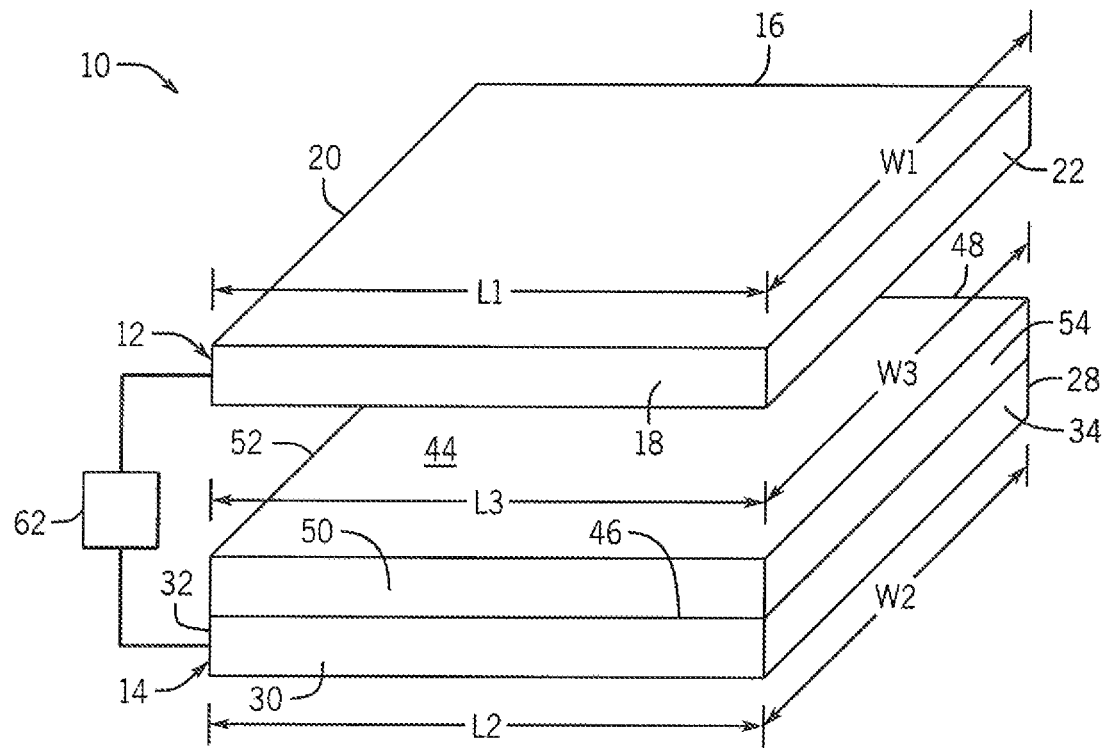
FIG. 1 is an isometric view of a triboelectric nanogenerator in accordance with the present invention.
Figure 2:
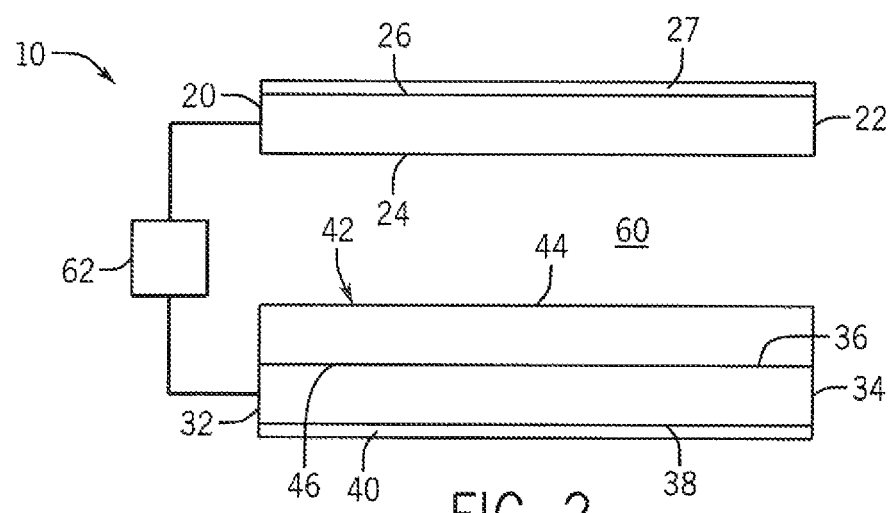
FIG. 2 is a side elevational view of the triboelectric nanogenerator of FIG. 1.
Figure 3:
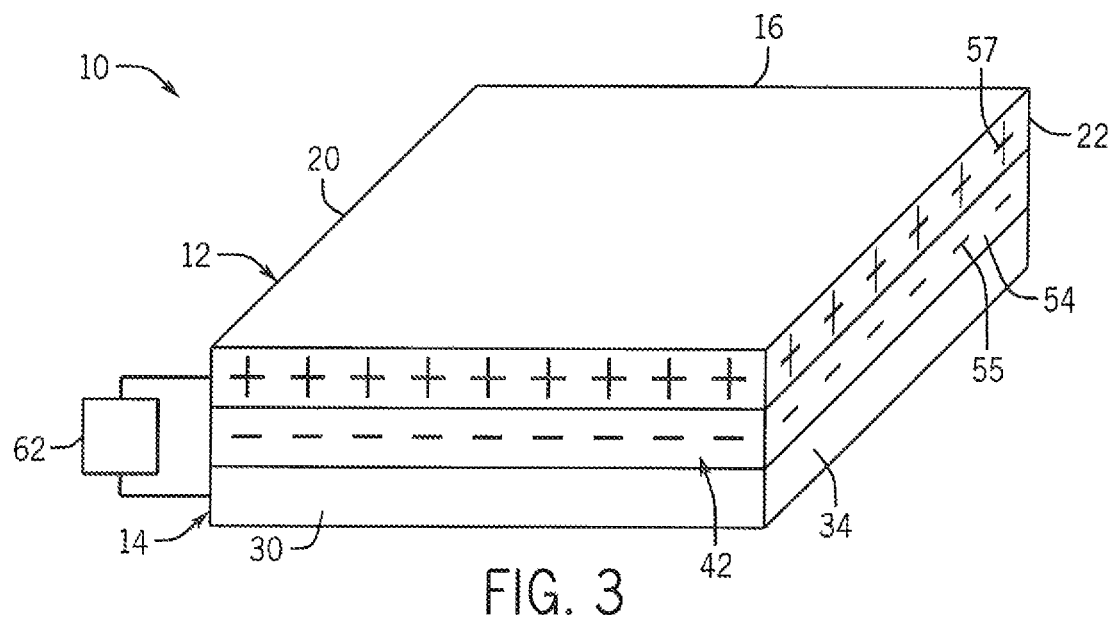
FIG. 3 is an isometric view of the triboelectric nanogenerator of FIG. 1 in an initial configuration.

Referring to FIGS. 1-5, a triboelectric generator is accordance with the present invention is generally designated by the reference numeral 10. Triboelectric generator 10 includes first and second spaced electrodes 12 and 14, respectively. First electrode 12 is defined by first and second spaced edges 16 and 18, respectively, and first and second spaced ends 20 and 22, respectively. In the depicted embodiment, first electrode 12 has generally rectangular configuration having a length L1 and a width W1. However, other configurations of first electrode 12 are possible without deviating from the scope of the present invention. As best seen in FIG. 2, first electrode 12 further includes a generally planar inner surface 24 and a generally planar outer surface 26. By way of example, first electrode 12 may be fabricated from aluminum. However, first electrode 12 may be fabricated from other materials without deviating from the scope of the present invention. An insulating film 27 fabricated from an insulating material, e.g. polyimide, may be affixed to outer surface 26 of first electrode 12 in any conventional matter, such as by a silicone adhesive.

Second electrode 14 is defined by first and second spaced edges 28 and 30, respectively, and first and second spaced ends 32 and 34, respectively. It is contemplated for second electrode 14 to have a generally rectangular configuration wherein the length L2 and width W2 thereof are substantially identical to the length L1 and W1 of first electrode 12, for reasons hereinafter described. It can be appreciated that second electrode 14 may have other configurations without deviating from the scope of the present invention. Referring back to FIG. 2, second electrode 14 further includes a generally planar inner surface 36 directed toward inner surface 24 of first electrode 12 and a generally planar outer surface 38. By way of example, second electrode 14 may be fabricated from aluminum. However, second electrode 14 may be fabricated from other materials without deviating from the scope of the present invention. An insulating film 40 fabricated from an insulating material, e.g. polyimide, may be affixed to outer surface 38 of second electrode 14 in any conventional matter, such as by a silicone adhesive.

Triboelectric generator 10 further includes dielectric layer 42 having a first surface 44 directed towards inner surface 24 of first electrode 12 and a second surface 46 bonded to inner surface 36 of second electrode 14 in a conventional manner, such as by glue or the like. Dielectric layer 42 is further defined by first and second spaced edges 48 and 50, respectively, and first and second spaced ends 52 and 54, respectively. In the depicted embodiment, dielectric layer 42 has generally rectangular configuration having a length L3 and a width W3, wherein length L3 and width W3 are substantially identical to the length L2 and W2 of second electrode 14. It can be appreciated that dielectric layer 42 may have other configurations without deviating from the scope of the present invention. However, other configurations of dielectric layer 42 are possible without deviating from the scope of the present invention.

Figure 6:
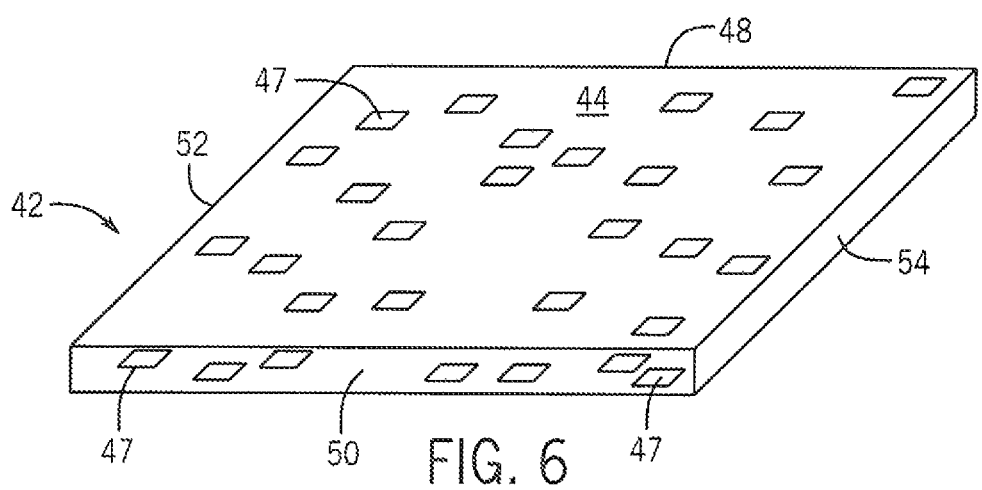
FIG. 6 is an isometric view of dielectric layer of the triboelectric nanogenerator of FIG. 1.

It is contemplated to fabricate dielectric layer 42 from a polymeric organosilicon compound, such as polydimethylsiloxane (PDMS), impregnated with dispersed biorenewable fillers 47, FIG. 6. More specifically, cellulose nanocrystal flakes (CNCFs) are orientedly embedded (e.g., generally parallel to first surface 44 of dielectric layer 42) in the PDMS of dielectric layer 42. The biorenewable fillers 47 or CNCFs in the PDMS may be uniformly dispersed to increase the inside contact area (friction area) in comparison with pure PDMS, and hence, significantly enhance the electrical output performance of triboelectric generator 10. As hereinafter described, dielectric layer 42 is fabricated with a desired concentration of oriented CNCFs by a combination of wet milling, freeze drying, and spin coating techniques. However, dielectric layer may be fabricated utilizing other fabrication techniques without deviating from the scope of the present invention.

By way of example, the cellulose nanocrystals may be fabricated utilizing commercially available dissolving pulp dry lap made from, e.g., southern pine. It can be appreciated that cellulose nanocrystals may be fabricated from other cellulose materials without deviating from the scope of the present invention. The pulp dry lap is acid hydrolyzed with a selected acid, e.g., 64% sulfuric acid, at a selected temperature, e.g., 45° Celsius (C) for predetermined time period, e.g., approximately 1.5 hours (h) under a nitrogen blanket with constant stirring. The acid is neutralized with, e.g., a 5% aqueous sodium hydroxide solution. Any sodium sulfate or other salts in the suspension are removed by ultrafiltration. Thereafter, the sulfuric-acid-hydrolyzed cellulose nanocrystal suspension (e.g., 1.0 weight %) is circulated in a wet ball milling system to fabricate nanoscale cellulose spheres (particles) with an average diameter of 25 nanometers (nm). Zirconium oxide ($ZrO_2$) balls with a diameter of 800 micrometers (μm) are employed as grinding media. The milled cellulose suspension is freeze dried and grinded with the ZrO$_2$ balls, leading to CNCFs with a diameter of approximately 25±7 μm and a thickness of approximately 1.6±0.5 μm.

Thereafter, the CNCFs, in a selected concentration, are dispersed in 2-propanol, followed by dispersion in a diluted polymeric organosilicon compound, e.g., 60 weight % PDMS, using a solvent, such as 2-propanol. Ultrasonication may be used to enhance the CNCFs dispersion. The solvent evaporation is provided by processing the solution on a hot plate at selected temperature, e.g. 80° C. After the step of solvent evaporation has been completed, a curling agent is added into the PDMS/CNCFs solution at a desired weight ratio, e.g. 1:10. A PDMS/CNCFs composite film is formed by spin coating to desired thickness, e.g., approximately 200±5 μm. The CNCFs are oriented parallel to the surface of the PDMS (namely, first surface 44 of dielectric layer 42) due to shear flow and thinning of the PDMS/CNCFs composite film thickness from centrifuging. Finally, the PDMS/CNCFs composite film is dried in a vacuum oven at a selected temperature, e.g., 80° C., for a selected time period, e.g., one hour. The PDMS/CNCFs composite film is then cut into a desired configuration to form dielectric layer 42 having the desired length L3 and width W3, as heretofore described.

In operation, first electrode 12 is axially aligned with second electrode 14 such that: 1) first and second edges 16 and 18, respectively, of first electrode 12 are aligned with first and second edges 28 and 30, respectively of second electrode 14; and 2) first and second ends 20 and 22, respectively, of first electrode 12 are aligned with first and second ends 32 and 34, respectively, of second electrode 14, FIGS. 1-2. In an initial state, first electrode 12 and dielectric layer 42 are separated with no potential difference therebetween. Utilizing an external force, such as a mechanical force, first electrode 12 is axially moved toward dielectric layer 42 until inner surface 24 of first electrode 12 engages and compresses first surface 44 of dielectric layer 42, FIG. 3. When inner surface 24 of first electrode 12 engages and compresses first surface 44 of dielectric layer 42, negative triboelectric charges 55 are donated to dielectric layer 42, leaving positive charges 57 on inner surface 24 of first electrode 12. The charge transfer is driven by friction, based on the triboelectric effect since the triboelectric polarity was an original material property. The dispersed CNCFs in dielectric layer 42 increase the friction area in dielectric layer 42, thereby allowing dielectric layer 42 to store additional charges in comparison to a dielectric layer fabricated from pure PDMS and increasing the electrical output of triboelectric generator 10, as hereinafter described. It is noted that with inner surface 24 of first electrode 12 in engagement with first surface 44 of dielectric layer 42, triboelectric generator 10 is in an electrostatic equilibrium state, wherein no electric output from the device is provided.

Figure 4:
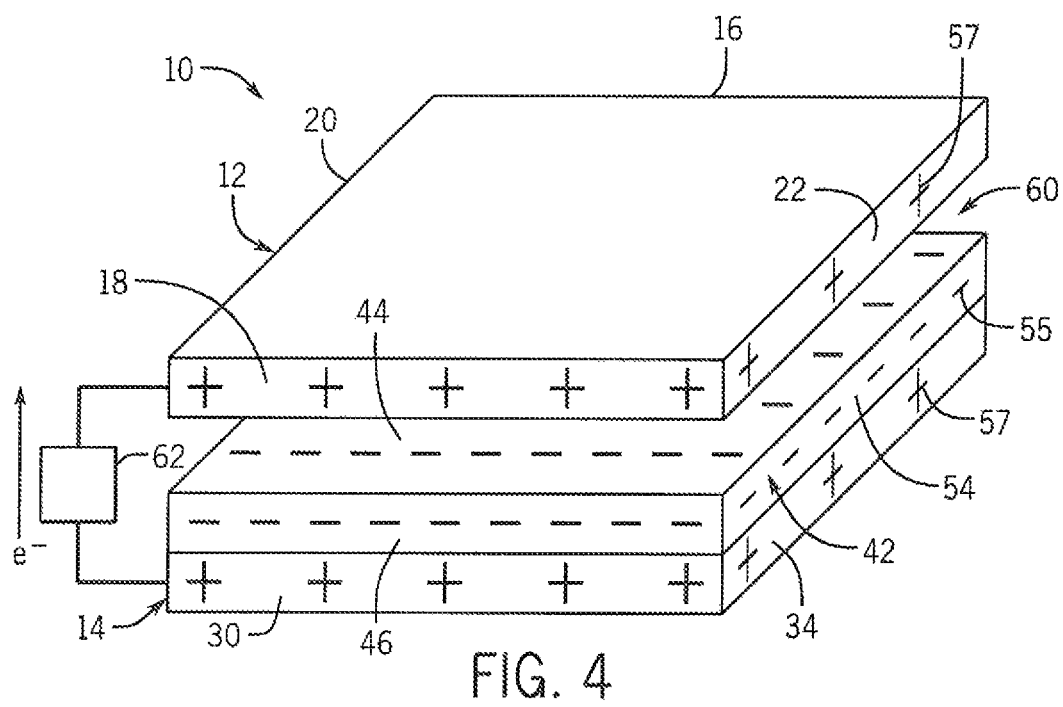
FIG. 4 is an isometric view of the triboelectric nanogenerator of FIG. 1 in an expanded configuration.
Figure 5:
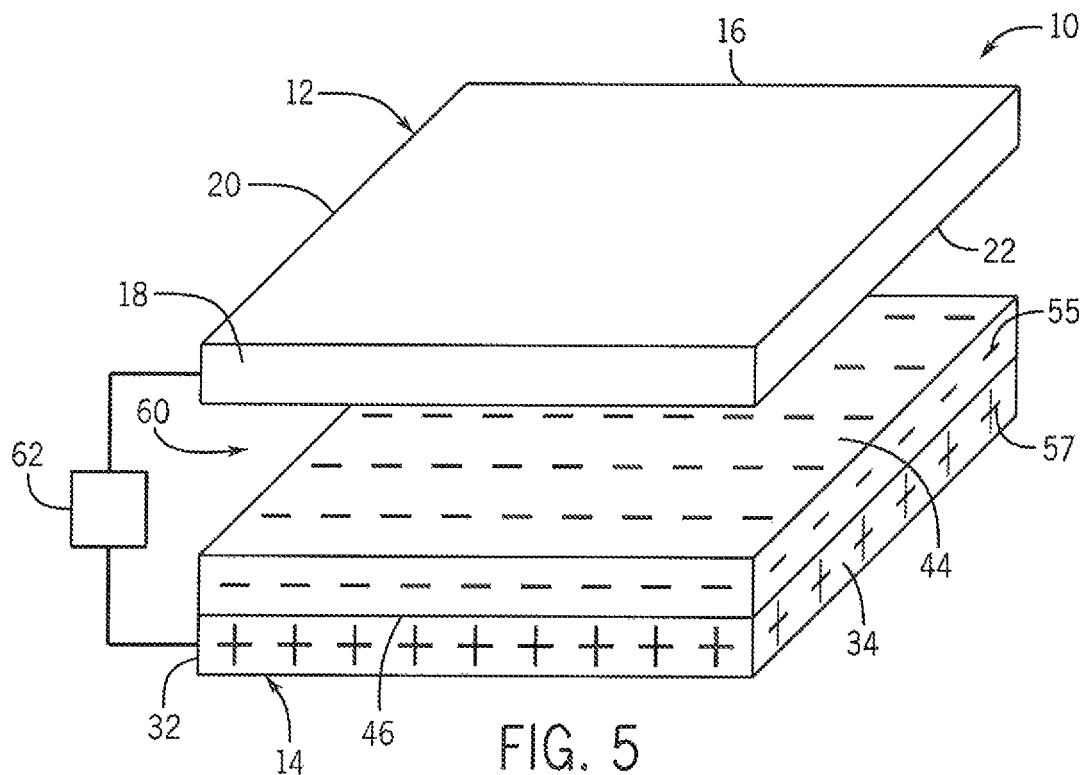
FIG. 5 is an isometric view of the triboelectric nanogenerator of FIG. 1 in an expanded configuration after reaching electrostatic equilibrium.
Figure 8:
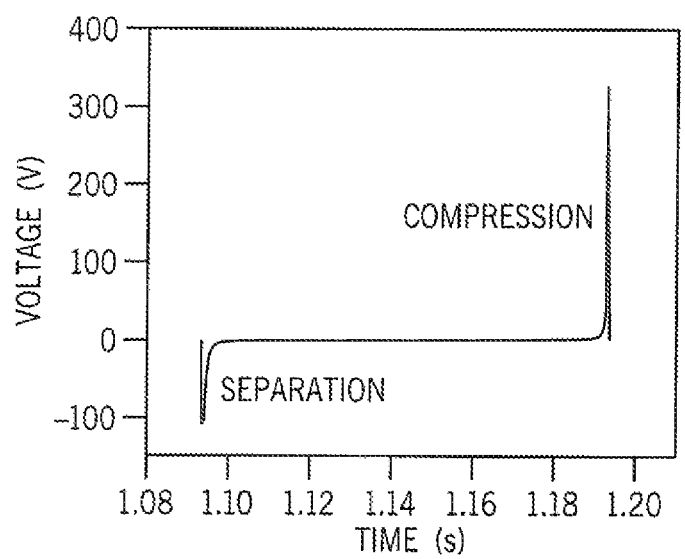
FIG. 8 is a graphical representation of the voltage output of the triboelectric nanogenerator of the present invention over one separation and compression cycle.

Thereafter, first electrode 12 is mechanically separated from dielectric layer 42 such that inner surface 24 of first electrode 12 disengages from first surface 44 of dielectric layer 42 so as to create air gap 60 therebetween, FIG. 4. Air gap 60 isolates the charge on first surface 44 of dielectric layer 42 from inner surface 24 of first electrode 12, thereby separating the positive and negative charges. As a result, first electrode 12 has a higher potential, as compared to second electrode 14. Consequently, electric current flows through an electrical load 62 interconnecting between first and second electrodes 12 and 14, respectively, in order to equalize the charge potential and neutralize the positive triboelectric charges, thereby resulting in a negative half cycle of the triboelectric charge generation, FIG. 8. As is known, the charges on first and second electrodes 12 and 14, respectively, have a distance-dependent redistribution; and the total charges on the two electrodes are conserved. Hence, as first electrode 12 is mechanically separated from first surface 44 of dielectric layer 42, a new electrostatic equilibrium is obtained which is dependent upon the spacing between first and second electrodes 12 and 14, respectively, FIG. 5.

Once a new electrostatic equilibrium is obtained, first electrode 12 is, once again, axially moved toward dielectric layer 42 until inner surface 24 of first electrode 12 engages and compresses first surface 44 of dielectric layer 42. As inner surface 24 of first electrode 12 is brought into contact with first surface 44 of dielectric layer 42, the electrostatic equilibrium is broken such that electrons flow back to second electrode 14 from first electrode 12 through the electrical load 62, so as to produce a positive half cycle of the triboelectric charge generation, FIG. 8. Electrons are transferred between first and second electrodes 12 and 14, respectively, until a new electrostatic equilibrium is reached, FIG. 3. Hence, by periodically bringing inner surface 24 of first electrode 12 into engagement with first surface 44 of dielectric layer 42 and by subsequently separating first electrode 12 from dielectric layer 42, an electrical output in the form of alternating current is provided across the first and second electrodes 12 and 14, respectively, of triboelectric generator 10.

Figure 7A:
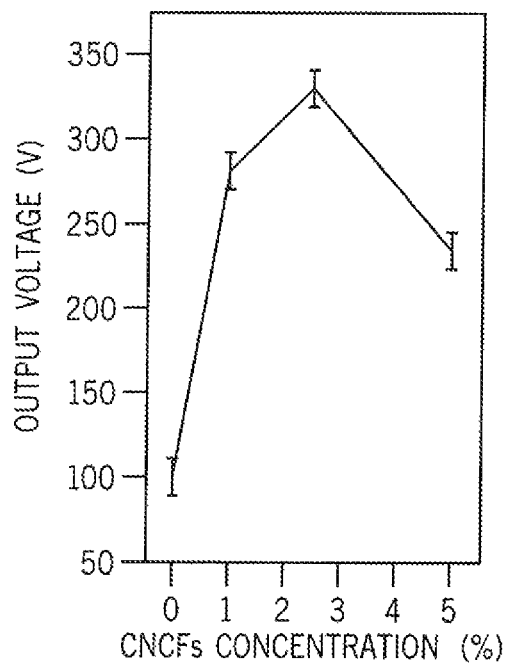
FIG. 7a is a graphical representation of an exemplary voltage output of the triboelectric nanogenerator of the present invention under a periodic compressive force versus the concentration of biorenewable fillers in the dielectric layer of the triboelectric nanogenerator.
Figure 7B:
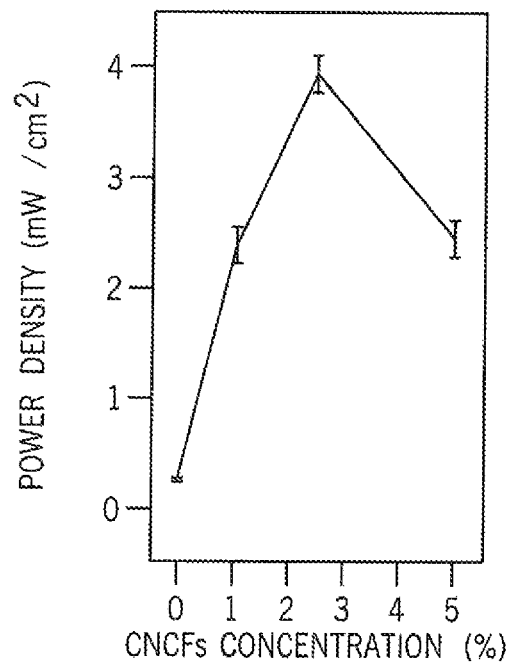
FIG. 7b is a graphical representation of an exemplary power density of the triboelectric nanogenerator of the present invention characterized with a selected resistance under a periodic compressive force versus the concentration of biorenewable fillers in the dielectric layer of the triboelectric nanogenerator.

Due to the increased internal effective friction area provided by the CNCFs impregnated in dielectric layer 42, In addition, the periodic compression of dielectric layer 42 significantly enhances the electrical output performance of triboelectric generator 10 over prior triboelectric generators. More specifically, under a periodic compressive force of 40 Newtons, a concentration of 3% of CNCFs in dielectric layer 42 allow for a 1.5 cm×1.5 cm square triboelectric generator to generate an open-circuit voltage of approximately 320 Volts (V), FIG. 7$a$, and a closed-circuit current density of approximately 5 μA/cm$^{-2}$, thereby resulting in a high-output power of approximately 8.7 milliwatts (mW) (or approximately 3.89 mW/cm$^{-2}$, FIG. 7$b$) under periodic compression or, more generally, a roughly 10-fold power enhancement in comparison with pure film-based triboelectric nanogenerators (TGs). As heretofore described, the enhanced electric output of triboelectric generator 10 can be attributed to the increased surface area-to-volume ratio in dielectric layer 42. Since cellulose and PDMS are not compatible, they are loosely contacted with each other during compression. The CNCFs are relatively triboelectric neutral or positive and generate positive charges during friction.

Various modes of carrying out the invention are contemplated as being within the scope of the following claims particularly pointing out and distinctly claiming the subject matter, which is regarded as the invention.

We claim:

1. A triboelectric generator, comprising:
  a first electrode having an inner surface and an outer surface;
  a second electrode having an inner surface and an outer surface;
  a dielectric layer having a first surface and a second surface in engagement with the inner surface of the second electrode; and
  a plurality of biorenewable fillers, each of the plurality of biorenewable fillers having a length, a width and a thickness and being orientedly embedded in the dielectric layer such that each of the plurality of biorenewable fillers are orientated parallel to the first surface of the dielectric layer;

wherein:
the length and the width of each of the plurality of biorenewable fillers are greater than the thickness of each of the plurality of biorenewable fillers;
the plurality of biorenewable fillers are uniformly distributed throughout the dielectric layer; and
periodic engagement of the first surface of the dielectric layer with the inner surface of the first electrode generates an electrical output across the first and second electrodes.

2. The triboelectric generator of claim 1 wherein the inner surface of the first electrode is directed towards the inner surface of the second electrode.

3. The triboelectric generator of claim 1 wherein the dielectric layer is fabricated from polydimethylsiloxane (PDMS).

4. The triboelectric generator of claim 1 wherein the biorenewable fillers are fabricated from cellulose nanocrystals.

5. The triboelectric generator of claim 4 wherein the cellulose nanocrystals are flakes.

6. The triboelectric generator of claim 1 wherein at least one of the first and second electrodes is moveable between a first position wherein the first surface of the dielectric layer is spaced from the inner surface of the first electrode and a second position wherein the first surface of the dielectric layer is in contact with the inner surface of the first electrode.

7. A triboelectric generator, comprising:
a first electrode having a generally flat surface;
a second electrode having a generally flat surface; and
a dielectric layer positioned adjacent to the surface of the first electrode; and
a plurality of biorenewable fillers, each of the plurality of biorenewable fillers having a length, a width and a thickness and being orientedly embedded in the dielectric layer such that each of the plurality of biorenewable fillers are orientated parallel to a first surface of the dielectric layer;
wherein:
the length and the width of each of the plurality of biorenewable fillers are greater than the thickness of each of the plurality of biorenewable fillers;
the plurality of biorenewable fillers are uniformly distributed throughout the dielectric layer; and
periodic compression of the dielectric layer between the first and second electrodes generates an electrical output across the first and second electrodes.

8. The triboelectric generator of claim 7 wherein the surface of the first electrode is directed towards the surface of the second electrode.

9. The triboelectric generator of claim 7 wherein the dielectric layer is fabricated from polydimethylsiloxane (PDMS).

10. The triboelectric generator of claim 7 wherein the biorenewable fillers are fabricated from cellulose nanocrystals.

11. The triboelectric generator of claim 10 wherein the cellulose nanocrystals are flakes.

12. The triboelectric generator of claim 7 wherein at least one of the first and second electrodes is moveable between a first position wherein the outer surface of the dielectric layer is spaced from the second electrode and a second position wherein the outer surface of the dielectric layer is compressed by the second electrode.

13. A method of generating electrical power, comprising the steps of:
orientedly embedding a plurality of biorenewable fillers in a dielectric layer such that each of the plurality of biorenewable fillers are orientated parallel to a first surface of the dielectric layer and are uniformly distributed throughout the dielectric layer;
positioning first and second electrodes on opposite sides of the dielectric layer in spaced relationship to each other; and
compressing the dielectric layer impregnated with biorenewable fillers between the first and second electrodes to generate an electrical output across the first and second electrodes
wherein each of the plurality of biorenewable fillers having a length, a width and a thickness, the length and the width of each of the plurality of biorenewable fillers being greater than the thickness of each of the plurality of biorenewable fillers.

14. The method of claim 13 wherein the dielectric layer is fabricated from polydimethylsiloxane (PDMS).

15. The method of claim 13 wherein the biorenewable fillers are fabricated from cellulose nanocrystals.

16. The method of claim 15 wherein the cellulose nanocrystals are flakes.

17. The method of claim 13 wherein the step of compressing the dielectric layer comprises the additional step of periodically moving at least one of the first and second electrodes between a first position wherein the dielectric layer is spaced from at least of one of the first and second electrodes and a second position wherein the dielectric layer is compressed between the first and second electrodes.

* * * * *